Nov. 13, 1934.  O. R. SCHULTZ  1,980,443
METHOD OF MAKING INTAGLIO PRINTING PLATES
Filed March 3, 1931   2 Sheets-Sheet 2
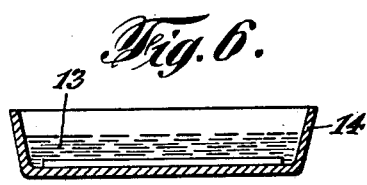
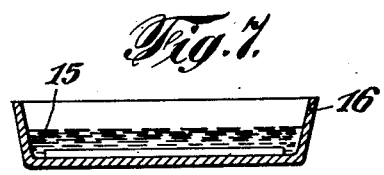
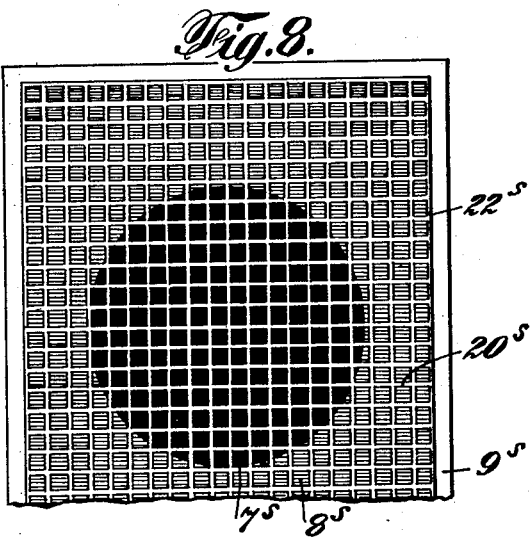
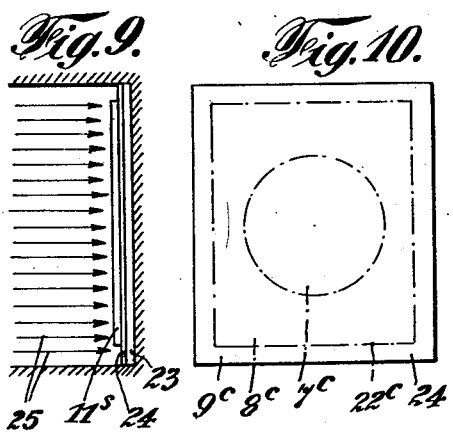
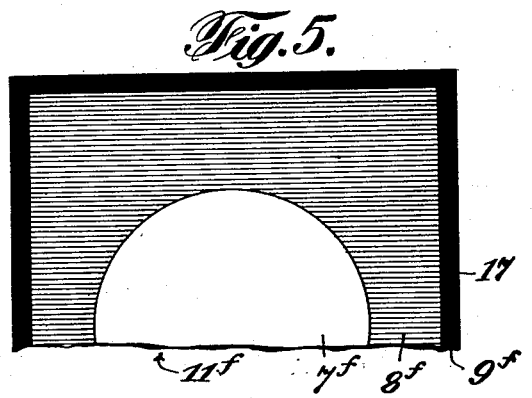
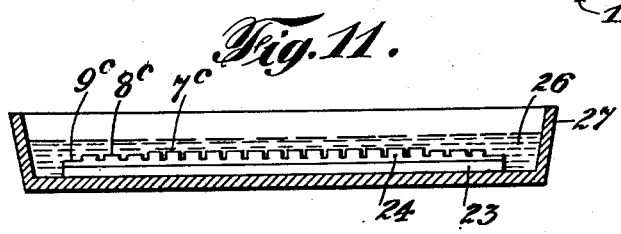
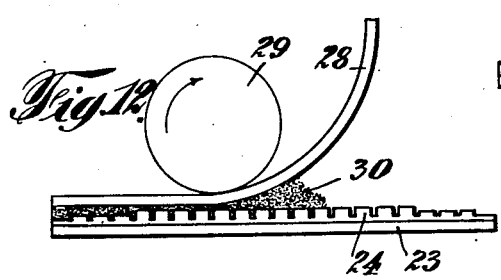
INVENTOR
Oswald R. Schultz
BY
Reuben J. Carlson
his ATTORNEY Patented Nov. 13, 1934

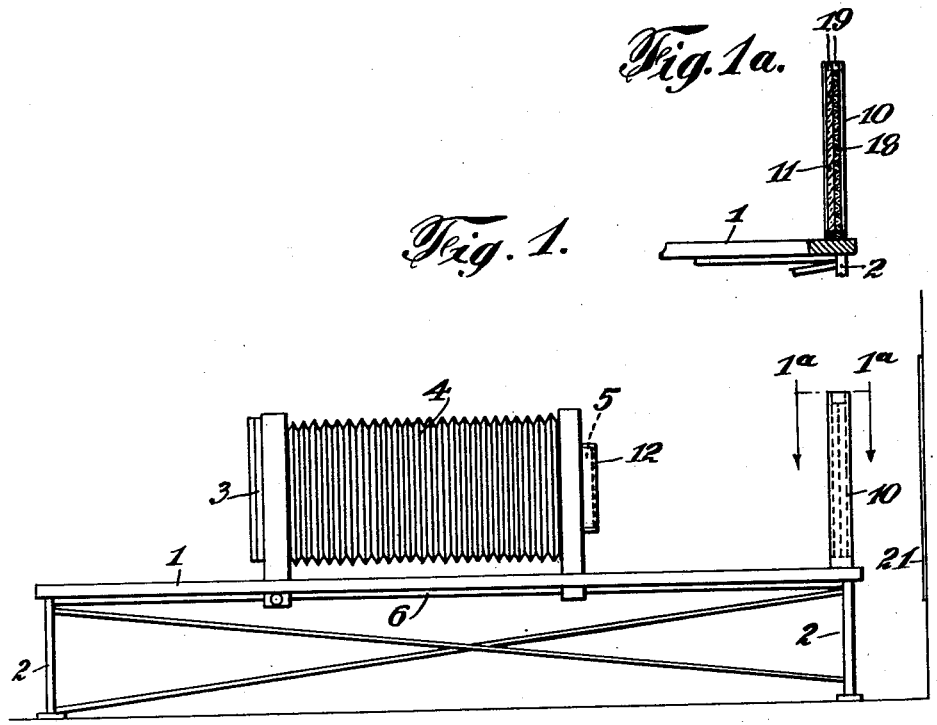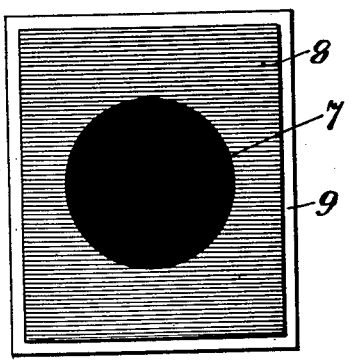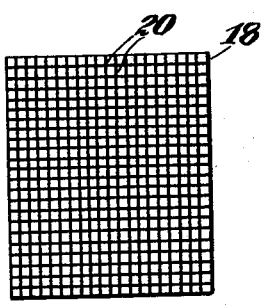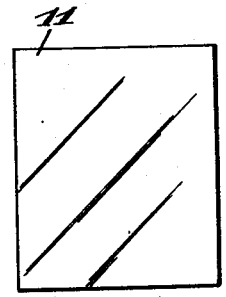

1,980,443

UNITED STATES PATENT OFFICE 1,980,443

METHOD OF MAKING INTAGLIO PRINTING PLATES

Oswald R. Schultz, New York, N. Y.

Application March 3, 1931, Serial No. 519,712

17 Claims. (Cl. 95—5.6)

This invention relates to a method of making printing plates, and more particularly to method of making intaglio screened printing plates for use in the graphic arts.

Under present methods of making copy reliefs for intaglio printing, the object to be reproduced is photographed with a copying camera, and a photographic plate with the object image thereon is obtained. The potographic plate is treated with a suitable developer and then placed in a frame over a sensitized gelatine coated copy plate, which is to form the copy relief. The copy plate is then exposed to light in such a manner that only the light rays which pass through the photographic plate strike the gelatine surface. These light rays harden the sensitized gelatine areas in degrees which vary directly with the amount of light absorbed by the gelatine. Now to produce an intaglio or screened effect on the once exposed gelatine plate, a screen is placed over the copy plate, completely covering the same, and the copy plate is then given a second light exposure for the required time period as a separate operation. The copy plate thus twice exposed is then inserted in a water bath, the gelatine swelling or rising to form the copy relief. In the preparation of the copper etch plate used in intaglio printing, the water swollen gelatin copy relief is applied to the copper plate or cylinder, and the printing surface then obtained by etching through the gelatin deposited upon the copper and into the copper surface. In this process it is essential for the production of clear printing, that the intaglio screen lines stand out strong and distinct so that they will properly support the doctor blade moved thereover. To produce sufficiently strong lines on the copper etched plate, it has been considered essential and necessary to expose the intaglio screen onto the gelatin copy relief as a separate and distinct operation, in the well known frame used for this purpose.

I have discovered that in the preparation of intaglio printing plates by means of the casting process as disclosed in the patent to Sauer No. 1,811,971, that the screening of the gelatin coated copy relief may be performed at the time the picture is exposed as a single operation, either in the camera, or in the dark room. The screen lines as thus applied to the gelatin copy relief are fully adequate and strong to produce an excellent intaglio printing plate by the casting process as disclosed in the Sauer patent above referred to.

The printed work produced by printing plates heretofore made, is often seriously defective in that a smudge of ink often appears on the uncolored portions of the printed matter and also encircles the outer margin of the printed matter or picture. I have discovered that this defective printing is traceable to certain defects present in the copy relief as heretofore made. I have further discovered that the copy relief is made defective by the presence of the screening relief which extends into the uncolored portions of the picture and beyond the picture margin. In other words, the ink smudge occurring on the printed work is caused by the ink which settles into the recesses formed by that part of the screen which overlaps the picture object already impressed upon the sensitized gelatine copy plate during the first light exposure. Screens such as are used in intaglio printing, are very expensive, and therefore it is impractical, if not impossible, to cut the screen to the exact shape and size of the object as impressed upon the sensitized gelatine copy plate, so that screen overlapping does not occur. The process of producing etched printing plates, as heretofore practiced, is further nore tedious, time consuming, and expensive, an the steps required to produce the same are many, intricate and delicate to perform.

An object of my invention is to devise a method of producing clear and smudgeless graphic printing.

Another object of my invention is to devise an improved method of making intaglio printing plates of high grade from gelatin copy reliefs.

Another object of my invention is to devise an improved method of making intaglio printing plates which eliminates certain steps in preparation of copy relief heretofore considered necessary, the printing plates producing printed work which is clear, clean cut and free from spots and smudge.

Other objects of this invention will become evident as the disclosure proceeds.

In accordance with my invention, the object to be photographed is suitably positioned before the lens of a commercial copying camera, and a continuous tone negative image thereof is photographed on the photographic plate. This negative is then treated in the usual developer and fixer baths and all necessary retouching done on the same. The margins of the image or picture as well as all uncolored parts are now blocked out on the negative plate with opaque paint. The negative is then positioned in a frame in front of the camera lens and an intaglio screen having opaque lines is positioned either immediately over or in back of the negative. A white background should also be provided. A second photographic plate is positioned in the camera and when the camera cap is pulled off, a screened image of the picture carried in negative on the first photographic plate is obtained on the second photographic plate in a single operation. This second photographic plate now carries the picture object in positive and the screen in negative. No screen lines on the second plate, however, overlap or extend beyond the margins of the picture or over the uncolored parts of the picture since these parts of the screen have been concealed by the opaque paint placed over the first plate and therefore are not visible and are not photographed on the second plate. The second plate carrying the screened object image is immersed in the developer and fixer baths and after being dried is framed over the sensitized gelatine coated surface of the copy plate. When the copy plate with the screened photographic positive thus mounted thereon is subjected to the action of light, the gelatine areas become hardened in degrees varying according to the light intensity to which it is subjected. After an exposure of from 15 to 50 minutes, the photographic positive is removed from the frame and the exposed copy plate then immersed in a tank of water. The water causes the gelatine to swell or rise in degrees which vary with the amount of light absorbed by the gelatine during the exposure. The copy plate is allowed to remain in water for about 3 minutes, after which it is removed, dried and hardened, forming the copy relief on which the intaglio lines appear clear and distinct. The intaglio printing form is then cast from this copy relief by rolling plastic material such as a cellulosic compound in a plastic state into contact with the copy relief in the manner taught by Sauer Patent No. 1,811,971.

Since the photographic positive carries both the object image and the screen lines, the object image and the screen lines are impressed upon the sensitized gelatine at one and the same time and by one light exposure. The object image, as appearing on the photographic positive, is fully screened but the screen impressions at no place extend into the uncolored parts of the object image or overlap the object image but extend smoothly and uniformly to the color edges of the object image only. This uniformity is accomplished by blocking out the uncolored parts and the color margins on the first negative plate so that the screen lines extending into the uncolored parts are not visible and are not photographed on the second photographic plate. Overlapping of the screen impressions is thus completely eliminated by my method, and in addition, the second light exposure step to which the sensitized gelatine copy plate has been subjected heretofore, is also eliminated.

In order that a clearer understanding of my invention may be had, attention is hereby directed to the accompanying drawings, forming a part of this application and illustrating certain possible embodiments of my invention.

Referring to the drawings, Figure 1 is a diagrammatic side view of a copying camera showing the picture supporting frame and reflecting background associated therewith;

Figure 1a is a fragmentary cross sectional view of the copying camera taken along lines 1a—1a of Figure 1, this view showing the picture supporting frame holding in position a photographic plate and screening plate;

Figure 2 is a face view of the object or picture to be photographed;

Figure 3 is a face view of the intaglio screening plate used to screen the photographic negative.

Figure 4 is a face view of the photographic plate as it appears before exposure in the camera;

Figure 5 is an enlarged fragmentary face view of the first photographic plate as it appears after exposure in the camera, this view showing particularly the object image appearing on the plate in negative, and the white parts and margins of the picture blocked out with opaque paint;

Figure 6 shows the exposed photographic plate immersed in a liquid developer;

Figure 7 shows the exposed photographic plate after leaving the developer and immersed in a fixer bath;

Figure 8 is an enlarged fragmentary face view of the second photographic plate obtained from photographing the first photographic plate and intaglio screening plate together, this view showing particularly the object image in positive and the screen lines in negative, the screen lines being shown as extending evenly to the color margins of the picture, the lines being greatly enlarged for purposes of illustration;

Figure 9 is a diagrammatic illustration of the method used in exposing to the light the sensitized gelatine copy plate to which the second screened photographic plate has been attached;

Figure 10 is a face view of the sensitized gelatine copy plate as it appears after exposure, the second photographic plate having been removed;

Figure 11 shows the exposed gelatine copy plate immersed in a water bath, the action of which causes the gelatine to swell in varying amounts;

Figure 12 illustrates diagrammatically one method of casting the printing form from the completed copy relief; and Figure 13 shows the intaglio printing form as completed and ready for use in printing.

Similar reference characters refer to similar parts throughout the several views of the drawings.

I have shown in Figure 1 a copying camera mounted generally on a supporting table 1 provided with legs 2. The camera comprises generally a plate adapter 3, bellows 4, and objective 5, all slidably mounted on a guide rack 6. The object to be photographed, for simplicity of illustration, is shown in Figure 2 to be a card having painted or pictured thereon a black ball 7 set off on a gray or half tone background 8, the margin 9 of the picture being white. This card is supported in a supporting frame 10 movable along the guide rack 6 towards and away from the objective 5. The photographic plate 11, shown in Figure 4, is mounted in the plate adapter 3.

In taking a photograph, the card shown in Figure 2 is positioned in the supporting frame 10. A photographic plate, such as shown in Figure 4, is then positioned in the camera, the camera focused and the plate adapter 3 adjusted with respect to the card, so that the object image appearing on the photographic plate will be clear and distinct and of the desired shape and size. The picture is then taken by quickly removing the cap 12, and the photographic plate, which now has the object image pictured in negative thereon, is removed from the camera. This plate will henceforth be termed the first photographic plate or the continuous tone negative and designated 11f.

The first photographic plate 11f, as removed from the camera, is taken to a dark room and immersed in a developer bath 13, contained in a suitable tank 14, as diagrammatically illustrated in Figure 6. After immersion in the developer bath for a proper period, the first plate 11*f* is immersed in a fixer bath 15, contained in a tank 16, as diagrammatically illustrated in Figure 7. When the plate 11*f* is removed from the fixer bath 15 after immersion for the required period the object image appears thereon in negative, i. e., the ball portion 7*f* appearing light in color, the background portion 8*f* medium dark in color, and the margin portion 9*f* very dark in color, as shown more particularly in Figure 5.

The first photographic plate 11*f*, after removal from the fixer bath 15, is thoroughly dried. All parts of the image which appear blurred or not distinct are then "retouched", thereby removing from the plate such defects as result from imperfect photographing or otherwise. A clear distinct and perfect image of the picture on the plate 11*f* is thus obtained. The margins of the picture image appearing on plate 11*f*, and all parts of the finished picture which are to appear uncolored are "blocked out" with opaque paint 17, as shown in Figure 5. This "blocking out" operation, as well-known in the art, is done by applying an opaque paint with a brush to the margins of the picture image and to all other parts of the picture image which are to appear not colored.

The unscreened, retouched and blocked out plate 11*f*, as shown in Figure 5, is now inserted in the supporting frame 10 of the camera in an upright position. An intaglio screening plate 18, such as shown in Figure 3, is also inserted into the frame 10, preferably immediately in back of the first photographic plate 11*f*. The frame 10 may be provided with suitable guides 19, extending vertically or horizontally, to retain the photographic p'ate 11*f* and the screening plate 18 in proper position. The intaglio screening plate 18 comprises generally a transparent glass plate having fine opaque screen lines 20 drawn thereon. The screen lines 20 may be either straight, irregular or mezzotint in form, and it is understood that when the word screening plate or screen is hereafter referred to, any and all of the well-known intaglio screens used in printing is encompassed thereby.

A second photographic plate, similar to the plate 11 shown in Figure 4, and hereafter designated 11*s* is positioned in the camera as before. The camera is focused and the p'ate adapter 3 adjusted with respect to the frame 10 (which now supports the first photographic plate 11*f* and the screen 18), so that as one looks into the camera, both the object and screen will appear clear, distinct and of the proper shape and size. A reflecting wall or background 21, preferably white in color, is placed directly in back of the supporting frame 10, and a strong light (not shown) is thrown thereon. The picture is then taken by removing cap 12 as before, and the second photographic plate 11*s* is removed from the camera. It will be noted that the object and the screen is thus impressed on the second photographic plate at the same time and during a single exposure.

The plate 11*s* is immediate'y taken to a dark room where it is first immersed in the developer bath 13 and then the fixer bath 15. The plate is then thoroughly dried and finally appears as shown in Figure 8. It will be noted that the ball portion 7*s* of the second plate 11*s* appears dark in color, the background portion 8*s* medium dark in color, and the margin portion 9*s* light in color. The screen lines 20*s* (greatly enlarged in this figure for purposes of illustration) appear light in color and extend smoothly and evenly to the margins 22*s* of the picture image. Generally, the picture image appears on plate 11*s* in positive and the screen lines appear in negative.

Attention is particularly called to the fact that the screen lines 20*s*, appearing on the plate 11*s* and shown in Figure 8, do not overlap or extend beyond the margins of the picture. The white uncolored part or margin 9 of the picture is not screened. This result is obtained by "blocking out" on the first plate 11*f* the margins and uncolored portions of the picture. These blocked out portions conceal corresponding portions of the screen when they are positioned together in the supporting frame 10, so that when the second plate 11*s* is photographed these blocked out parts do not appear thereon. The first plate 11*f* and screen 20 may be photographed separately on to the second plate 11*s* but this method of procedure is more tedious and generally less desirable. It is now seen that by the method above described, a screened object image is obtained on the plate 11*s*, which is clear, and distinct and free from smudging and spotting imperfections.

A light sensitized copy plate is now prepared. As shown in Figure 9, the copy plate may comprise a backing 23, having a gelatine film 24 covering one side face thereof. The upper surface of the gelatine film 24 is sensitized to light. The sensitizing may be produced by treating the upper surface of the gelatine film 24 with chromate salts or similar sensitizing material. It is well-known that when gelatine so sensitized is exposed to light, the gelatine becomes hardened in degrees which vary directly with the amount and degree of light to which it is exposed. Further, when gelatine is immersed in water it will swell, the amount of swe'ling being inversely proportional to its hardness. I do not claim to have discovered this peculiar characteristic of gelatine, or the method of sensitizing the same, but contemplate using any form of copy relief material which can be formed by processes involving exposure to light.

The screened photographic plate 11*s*, as shown in Figure 8, is now placed directly over the sensitized surface of the copy plate. The copy plate is then exposed to light in such a manner that light rays 25 will strike the photographic positive, pass through the same where permitted and strike the sensitized gelatine surface of the copy plate. The sensitized surface of the copy plate is protected from all rays of light except those rays which pass through the photographic positive 11*s*. After an exposure of from 15 to 50 minutes the copy plate with the photographic plate 11*s* thereto attached is removed from the rays of light to a dark room where the photographic plate is removed from the copy plate. The light rays 23, to which the sensitized gelatine surface of the copy plate have been exposed, act to harden the sensitized gelatine in degrees which vary according to the amount of light which it has absorbed. Those areas on the sensitized gelatine which have been exposed to a small amount of light are less hard than those areas which have been exposed to a greater amount of light. I now have the screened copy plate shown in Figure 10 with the screening lines and the marginal edge 24*c* of the picture being clearly and sharply defined.

The exposed gelatine copy plate is now immersed in cold water 26 contained in a tank 27, as diagrammatically illustrated in Figure 11. The copy plate is here allowed to soak for about 3 minutes, the water causing the gelatine to swell in varying amounts inversely proportional to the hardness of the gelatine. In other words, the harder the gelatine the less it will swell, the softer the gelatine the more it will swell. This swelling produces a relief effect on the surface of the gelatine, which relief represents the intaglio screened object image as it appears on the photographic plate 11s. The intaglio copy plate is thoroughly dried and allowed to set for a few minutes and I then have the completed copy relief. On the completed copy relief the ball portion 7c will appear raised, the background portion 8c surrounding the ball will appear partly depressed and the screen line portions 20c and the uncolored and unscreened margin portions 9c will appear uniformly depressed, as shown in Figures 11 and 12.

From this copy relief the printing form shown in Figure 13 is cast by the method illustrated in Figure 12. The printing form is cast by pressing a backing 28 with a roller 29 or other pressure device into contact with the copy relief, a plastic or "dope" material 30 having been disposed between the copy relief of the backing. The plastic or dope material preferably comprises a plastic cellulosic compound. The backing 28 with the hardened plastic material 28 adhering thereto is then torn from the copy relief, and I have the completed printing form shown in Figure 13.

In the manufacture of an etched metallic plate it has heretofore been considered impossible to photograph the screen simultaneously with the object, because the intaglio lines which would be so formed on the sensitized gelatin, would not become sufficiently hard to protect the metal under the screen lines against the etching influence of the acid. In other words, the screen lines in an intaglio plate so formed would be etched away and would break down. For this reason the screening for intaglio printing has heretofore been done in a dark room as a separate and distinct operation from the photographing operation. By casting the printing plate from plastic material, as above disclosed, I have discovered that the screen lines on the printing plate will be fully formed so as to produce excellent printing work when the intaglio screen and the object image is submitted to a single exposure, either in the camera or in the dark room. The screen lines so formed on the water swollen gelatin relief are not broken down or injured by the casting operation above described. The cast intaglio plate is thus provided with intaglio screen lines which are fine and delicate, producing an unusually fine quality of printing, yet are sufficiently strong to carry and support the doctor blade commonly used in removing the ink from the plate during the printing operation.

It is also seen that by "blocking out" the uncolored parts and marginal portions of the picture image appearing on the unscreened photographic plate 11f and then photographing this plate simultaneously with the screen 18, the object image then appearing on the second photographic plate is perfectly screened over all color parts and to the exact boundaries of the picture, and all uncolored parts are left unscreened. In addition other imperfections, which would otherwise appear on the second plate, are removed by "retouching" the first plate. The copy relief obtained from my second photographic plate so made is perfect, and the intaglio printing plate cast from this relief is clear, clean and sharp and free from screen lines, shallows, high points or other irregularities where ink can collect to smudge and spot the finished work. The printed work turned out by an intaglio printing plate formed from my copy relief made as above possesses clear and distinct margins, and the uncolored portions of the printed work and margins thereof are clean and free from smudge and spots. My method of producing printing plates requires only one light exposure of the sensitized intaglio copy relief, whereas, by the method heretofore used two or three exposures have been necessary. Thus a delicate and time consuming operation has been eliminated. It is understood that the intaglio screen may be exposed simultaneously with the object image, either in the camera or in the usual dark room. It is further understood that the re-touching and blocking out operations above discussed need only be performed in connection with the production of the intaglio printing plates when the nature of the work so requires. It is also evident that my method requires no extra or new equipment, but the same and less equipment than heretofore required may be used.

As many changes could be made in the method outlined above and as many apparently widely different modifications of this invention could be made without departing from the scope thereof, it is intended that all matter contained in the above description or shown in the accompanying drawings shall be interpreted as illustrative and not in a limiting sense.

What I claim is:—

1. In the formation of intaglio printing plates from intaglio screened copy reliefs comprising making copy reliefs for intaglio printing which includes, photographing the object to produce in negative an object image on a photographic plate, retouching the object image appearing on said plate, blocking out the margins and uncolored portions of said object image, photographing said object image and a screen having opaque lines so that both the object image and the screen will be pictured on a second photographic plate with the object appearing thereon in positive, the opaque lines in negative and the blocked out portions of the object appearing unscreened, exposing a sensitized copy material through said second plate to the action of light, then treating said exposed copy material to produce thereon the copy relief, casting a hardenable plastic material onto said relief and thereafter stripping the same from said relief.

2. The method of intaglio printing plates, including photographing an object to produce in negative an object image on a photographic plate, retouching the object image appearing on said plate, blocking out the margins and uncolored portions of said object image, photographing said object image and a screen having opaque lines so that both the object image and the screen will be pictured on a second photographic plate with the object appearing thereon in positive, the opaque lines in negative and the blocked out portions of the object appearing unscreened, exposing sensitized hydrophilic copy material through said second plate to the action of light whereby to produce a differential hardening of said material directly varying with the amount of light impinged thereon, treating said exposed copy material with water to produce a copy relief thereon, the photochemically hardened portions of said material appearing in intaglio due to the inhibition of water by the lesser hardened portions and the swelling thereof, said differentially swollen material forming a copy relief, and casting a hardenable cellulosic plastic into and upon said copy relief.

3. A combined method of making copy reliefs and intaglio printing plates which includes blocking out the margins of an object to be photographed, photographing the object and a screen so that both the object and the screen will be pictured on a photographic plate, producing from the screen photographic plate a copy relief, and casting from moldable material a printing plate from said copy relief.

4. A combined method of making copy reliefs and intaglio printing plates of cellulosic material which includes blocking out the margins of an object to be photographed, photographing the object and a screen so that both the object and the screen will be pictured on a photographic plate, producing from the screen photographic plate a copy relief, and casting a printing plate from said copy relief.

5. The method of making intaglio printing plates which includes, exposing the object and a screen so that both the object and the screen will be pictured on the photographic plate, producing from the screened photographic plate a copy relief, and casting a hardenable plastic material onto said relief and thereafter stripping the same from said relief.

6. The method of making intaglio printing plates which includes, blocking out the margins of the object to be photographed, photographing the object and a screen so that both the object and the screen will be pictured on a photographic plate, producing from the screened photographic plate a copy relief, casting a hardenable plastic material onto said relief and thereafter stripping same from said relief.

7. The method of making intaglio printing plates which includes, retouching the object to be photographed, blocking out the uncolored portions of said object, and photographing the object and a screen so that both the object and the screen will be pictured on a photographic plate, producing from said photographic plate a copy relief and molding a hardenable plastic material onto said relief and thereafter stripping same from said relief.

8. In the formation of an intaglio printing plate from intaglio screened copy reliefs, the improvements comprising blocking out the margins and the uncolored portions of the object to be photographed, photographing the object and a screen simultaneously so that both the object and the screen will be pictured on a photographic plate producing from the screened photographic plate a copy relief, and casting a hardenable plastic material onto said relief and thereafter stripping same from said relief.

9. The method of making intaglio printing plates which includes, photographing the object on to a photographic plate, blocking out the margins and uncolored portions of the object image pictured on said plate, photographing said plate and a screen so that both the blocked out object image and the screen will be pictured on a second photographic plate with the blocked out portions of the object image appearing thereon unscreened, producing from the screened photographic plate a copy relief, and casting a hardenable plastic material onto said relief and thereafter stripping same from said relief.

10. The method of making intaglio printing plates which includes, photographing the object on to a photographic plate, retouching the object image pictured on said plate, blocking out the margins, uncolored portions of the object image pictured on said plate, and photographing said plate and a screen so that both the blocked out object image and the screen will be pictured on a second photographic plate with the blocked out portions of the object image appearing thereon unscreened, producing from the screen photographic plate a copy relief, and casting a hardenable plastic material onto said relief and thereafter stripping same from said relief.

11. The method of making intaglio printing plates which includes, photographing the object on to a photographic plate, blocking out the margins and uncolored portions of the object image pictured on said plate, exposing said plate and a screen so that both the blocked out object image and the screen will be pictured on a second photographic plate with the blocked out portions of the object image appearing thereon unscreened, producing from the screened photographic plate a copy relief, and casting a hardenable plastic cellulosic material onto said relief and thereafter stripping same from said relief.

12. The method of making intaglio printing plates which includes, photographing the object to produce in negative an object image on a photographic plate, blocking out the margins and uncolored portions of said object image, photographing said object image and a screen so that both the object image and the screen will be pictured on a second photographic plate with the blocked out portions of the object image appearing thereon unscreened, producing from the screened photographic plate a copy relief, and molding a hardenable cellulosic material onto said relief and thereafter stripping same from said relief.

13. The method of making intaglio printing plates which includes, photographing the object to produce in negative an object image on a photographic plate, blocking out the margins and uncolored portions of said object image, and photographing said object image and a screen having opaque lines so that both the object image and the screen will be pictured on a second photographic plate with the object appearing thereon in position, the opaque lines in negative and the blocked out portions of the object appearing unscreened, producing from the screened photographic plate a copy relief, and molding a hardenable cellulosic material onto said relief and thereafter stripping same from said relief.

14. The method of making intaglio printing plates which includes, photographing the object to produce in negative an object image on a photographic plate, retouching the object image appearing on said plate, blocking out the margins and uncolored portions of said object image, and photographing said object image and a screen having opaque lines so that both the object image and the screen will be pictured on a second photographic plate with the object appearing thereon in positive, the opaque lines in negative and the blocked out portions of the object appearing unscreened, producing from the screen photographic plate a copy relief, and molding a hardenable cellulosic material onto said relief and thereafter stripping same from said relief.

15. The method of making intaglio printing plates which includes, photographing the object on to a photographic plate, placing a screen adjacent said plate, reflecting light through said screen and plate so that both plate and screen are visible in the camera, and photographing said plate and screen simultaneously on to a second photographic plate so that both the object and the screening will be pictured on said second plate, producing from the screened photographic plate a copy relief, and molding a hardenable cellulosic material onto said relief and thereafter stripping same from said relief.

16. The method of making intaglio printing plates which includes, photographing the object on to a photographic plate, blocking out the object image and uncolored portions pictured on said plate, placing a screen adjacent said plate, reflecting light through said screen and plate so that both the object image and screen are visible in the camera, and photographing simultaneously said object image and screen so that both the object image and the screening will be pictured on a second photographic plate with the blocked out portions of the object image appearing thereon unscreened, producing from the screened photographic plate a copy relief, and molding a hardenable cellulosic material onto said relief and thereafter stripping same from said relief.

17. The method of forming printing plates which includes, exposing a sheet of sensitized gelatine copy material through an intaglio screened photographic plate, treating the said copy material with moisture to cause differential swelling thereof with the light hardened portions appearing in intaglio relief and casting a hardenable plastic material from said relief surface.

OSWALD R. SCHULTZ.